US00RE38350E

(19) United States
(12) Reissued Patent
Godfrey

(10) Patent Number: US RE38,350 E
(45) Date of Reissued Patent: Dec. 16, 2003

(54) GLOBAL SOUND MICROPHONE SYSTEM

(76) Inventor: Mike Godfrey, 258 Adelaide Street East, Suite 200, Toronto (CA), M5A 1N1

(21) Appl. No.: 09/595,351

(22) Filed: Jun. 15, 2000

Related U.S. Patent Documents

Reissue of:
(64) Patent No.: 5,778,083
Issued: Jul. 7, 1998
Appl. No.: 08/787,886
Filed: Jan. 23, 1997

U.S. Applications:

(63) Continuation of application No. 08/331,918, filed on Oct. 31, 1994, now abandoned.

(51) Int. Cl.[7] ..... H04R 3/06
(52) U.S. Cl. ..... 381/92; 381/26; 381/122; 381/355; 381/356
(58) Field of Search ..... 381/26, 92, 98, 381/111, 122, 182, 91, 339, 345, 355, 356, 358, 361, 362, 390, 395

(56) References Cited

U.S. PATENT DOCUMENTS

| | | | | | |
|---|---|---|---|---|---|
| 4,072,621 | A | * | 2/1978 | Bauer | 381/23 |
| 4,096,353 | A | * | 6/1978 | Bauer | 381/21 |
| 4,149,034 | A | * | 4/1979 | Kendall | 381/160 |
| 4,206,324 | A | * | 6/1980 | Horikawa et al. | 381/169 |
| 4,262,170 | A | * | 4/1981 | Bauer | 381/20 |
| 4,334,740 | A | * | 6/1982 | Wray | 352/11 |
| 4,393,270 | A | * | 7/1983 | van den Berg | 381/155 |
| 4,466,117 | A | * | 8/1984 | Gorike | 381/26 |
| 4,703,506 | A | * | 10/1987 | Sakamoto et al. | 381/92 |
| 4,740,086 | A | * | 4/1988 | Oehler et al. | 356/432 |
| 4,752,961 | A | * | 6/1988 | Kahn | 381/92 |
| 4,858,719 | A | * | 8/1989 | Fidi et al. | 381/158 |
| 4,866,682 | A | * | 9/1989 | Uchihashi et al. | 367/153 |
| 4,888,807 | A | * | 12/1989 | Reichel | 381/92 |
| 4,947,437 | A | * | 8/1990 | Firebaugh | 381/26 |
| 4,951,271 | A | * | 8/1990 | Garrett et al. | 367/141 |
| 5,007,285 | A | * | 4/1991 | Dahlen et al. | 367/4 |
| 5,058,170 | A | * | 10/1991 | Kanamori et al. | 381/92 |
| 5,260,920 | A | * | 11/1993 | Ide et al. | 381/83 |
| 6,069,961 | A | * | 5/2000 | Nakazawa | 381/92 |
| 6,097,825 | A | * | 8/2000 | Yoest et al. | 381/322 |
| 6,121,528 | A | * | 9/2000 | May | 84/411 R |

FOREIGN PATENT DOCUMENTS

| | | | | |
|---|---|---|---|---|
| GB | 2124058 | * | 2/1984 | H04R/1/00 |
| JP | 518572 | | 7/1976 | |
| JP | 52660 | | 1/1977 | |

* cited by examiner

*Primary Examiner*—Xu Mei
(74) *Attorney, Agent, or Firm*—Brady, O'Boyle & Gates

(57) ABSTRACT

A microphone system includes a portable frame for mounting linear pick-up microphones such that each of the microphones has its diaphragm facing outwards from the frame and the diaphragms form a generally elliptical pattern. A microphone with a substantially hemispherical pick-up pattern is mounted on the frame such that it is directed upwards and a second substantially hemispherical pick-up pattern microphone is mounted on the frame directed downwards. The linear pick-up pattern microphones are equispaced about the perimeter of the frame. There is a hand or camera grip depending downwards from the frame. The microphones of the frame can be electronically connected to the respective channels of a multi-channel sound system, or to the channels of a multi-channel digital mixer which in turn can be connected to a multi-channel sound recording device. The microphones may be selectively electronically connected and disconnected to adapt the system for a predetermined sound playback configuration.

20 Claims, 2 Drawing Sheets

GLOBAL SOUND MICROPHONE SYSTEM

Matter enclosed in heavy brackets [ ] appears in the original patent but forms no part of this reissue specification; matter printed in italics indicates the additions made by reissue.

This application is a continuation of application Ser. No. 08/331,918, filed Oct. 31, 1994 abandoned.

FIELD OF THE INVENTION

This invention relates in general to microphone systems and more particularly to global sound microphone systems which are portable.

BACKGROUND OF THE INVENTION

There are a number of existing "surround sound" systems which use digital or analogue equipment to record and reproduce sound. The goal of such systems is to recreate the sound environment. To recreate a sound environment, the surround sound system must be designed with an awareness of the human brain's ability to determine, within all three dimensions, where a given sound originates. The ear has two independent functions, one, to hear (auditory), the other to sense the motion of the listener or of an object in space identified by the listener (vestibular). Realistic sound production must give the listener a sense of vestibular as well as auditory function, thus, the motion of the listener or object in space identified by the listener is important to the perception of reality. The brain is able to recognize small differences in loudness and timing in soundwaves as they reach both the left and right ears so as to exactly localize and follow a sound source in space.

Systems are known in the art which exploit this fact. An example is the binaural system which uses two audio channels to record sound. The binaural system is able to achieve excellent results but the listener must wear headphones to experience the surround sound effect. Otherwise the reproduction is the equivalent of a traditional stereo, two-dimensional, recording.

Quadraphonic sound systems have also been devised. Such systems employ four audio channels in a "double stereo" pattern to provide a more realistic localization effect for the listener. This format has not achieved universal acceptance due to the fact that while it was meant for consumer use, there was not enough material available that was recorded for four channels. A special microphone, the Caldrec Soundfield, was developed to record quadraphonically by using four microphone diaphragms and four channels. The diaphragms can be electronically "zoomed" in on a specific channel. The limitation of this process is that the microphone must remain stationary in order for the signal levels received at the microphone diaphragms to remain uniform; it also only has four channels.

Multi-channel, surround sound audio systems are now widely accepted in the professional audio market. It is virtually a standard in major motion picture theatres worldwide. The technology is also becoming more commonplace in the consumer audio market. The public theatre and the private livingroom are now places where a realistic, natural sound environment can be created.

A typical surround sound environment consists of five to ten speakers placed around a room in several different configurations. In a movie theatre, for example, there may be three speakers behind the projection screen (left-centre, centre, and right-centre), two speakers at the sides of the room (left and right) and two speakers at the rear of the room (left and right surround). Each of these speakers is assigned its own specific channel. During the recording of the live sound sources for surround sound applications, the microphones are set up in a stationary position at approximately the site at which the sound will be heard though the coincident monitor speaker of the surround sound system. This technique works well, only if the perspective of the listener/viewer is meant to be stationary in relation to the sound. As a result, the listener's position, perceived or actual, must remain stationary and cannot move in relation to the sound. An example of this situation occurs when a camera moves or pans on an object which the listener is focusing his attention through a scene such as a jungle or a city street and surround sound is required to accompany it.

At the recording studio during final mixdown of the soundtrack, by using special multi-channel signal processors, an audio technician is able to take any recorded signal and sonically move that signal between any number of the channels, or speakers, in the system, thus creating the illusion that the sound is actually moving from one part of the listening environment to the other. Although this appears as an interesting effect it has been manipulated by a processor and though it may appear natural, it is not.

Thus a global microphone system which is able to be used to reproduce "surround sound" and which does not require headphones, which does not have to remain stationary, and which is able to create the effect of motion and exact specific auditory localization of the object in motion without using the mixing process, is desirable.

SUMMARY OF THE INVENTION

An object of one aspect of the present invention is to provide an improved type of microphone system.

In accordance with one aspect of the present invention there is provided a microphone system having a portable frame for mounting a plurality of microphones, each microphone of the plurality of microphones having a diaphragm, the plurality of microphones comprising a set of linear pick-up pattern microphones, whereby when mounted, each one of the set of linear pick-up microphones has its diaphragm facing outwards from the frame and the diaphragms of the set of microphones form a generally elliptical pattern.

Conveniently, the means for mounting a plurality of microphones further comprises a means for mounting a microphone having a substantially hemispherical pick-up pattern at a location within the generally elliptical pattern of the linear pattern microphones.

Preferably, the means for mounting a microphone having a substantially hemispherical pick-up pattern maintains the orientation of the microphone such that the hemispherical pick-up pattern of the microphone is normal to the plane of the elliptical pattern of the linear pattern microphones and the substantially hemispherical pick-up pattern is directed upwards.

Preferably, the means for mounting a plurality of microphones further comprises a second means for mounting a second microphone having a substantially hemispherical pick-up pattern at a location within the generally elliptical pattern and the second means for mounting a second microphone having a substantially hemispherical pick-up pattern is adapted to maintain the orientation of the second microphone such that the hemispherical pick-up pattern of the second microphone is normal to the plane of the elliptical pattern and is directed downwards.

Preferably, each microphone of the set of linear pick-up pattern microphones has a hypercardioid or other linear pick-up pattern.

Preferably there is provided a means for mounting one of the set of microphones at a position at a one end of the generally elliptical shape and means for mounting the set of the microphones in a generally equispaced relationship about the elliptical shape.

Conveniently, there is provided a hand grip depending downwards from the frame, alternatively the frame is attached to a camera.

Advantageously, there is provided a multi-channel audio mixer, means for electrically connecting each one of the set of the microphones with a one of the channels of the multi-channel mixer and a means for operatively connecting the multi-channel mixer with a digital multi-channel sound recording device or any advance on that technology.

Advantageously, there is provided a means for selectively electronically connecting and disconnecting ones of the set of microphones to adapt the system for a predetermined sound playback configuration.

Advantages of the present invention are that a portable system to faithfully, reproduce multiple sounds as recorded, and which permits recording while the object/system is in motion, is provided.

An advantage of an embodiment of the present invention is that the sound recorded is "rounded out".

A further advantage of an embodiment of the invention is that the microphone system may be hand-held.

An advantage of an embodiment of the invention is that the microphone system may be used in conjunction with a camera to achieve holographic sonic results.

BRIEF DESCRIPTION OF THE DRAWINGS

A detailed description of the preferred embodiment is provided herein below with reference to the following drawings, in which.

DETAILED DESCRIPTION OF THE PREFERRED EMBODIMENT

Figure 1:
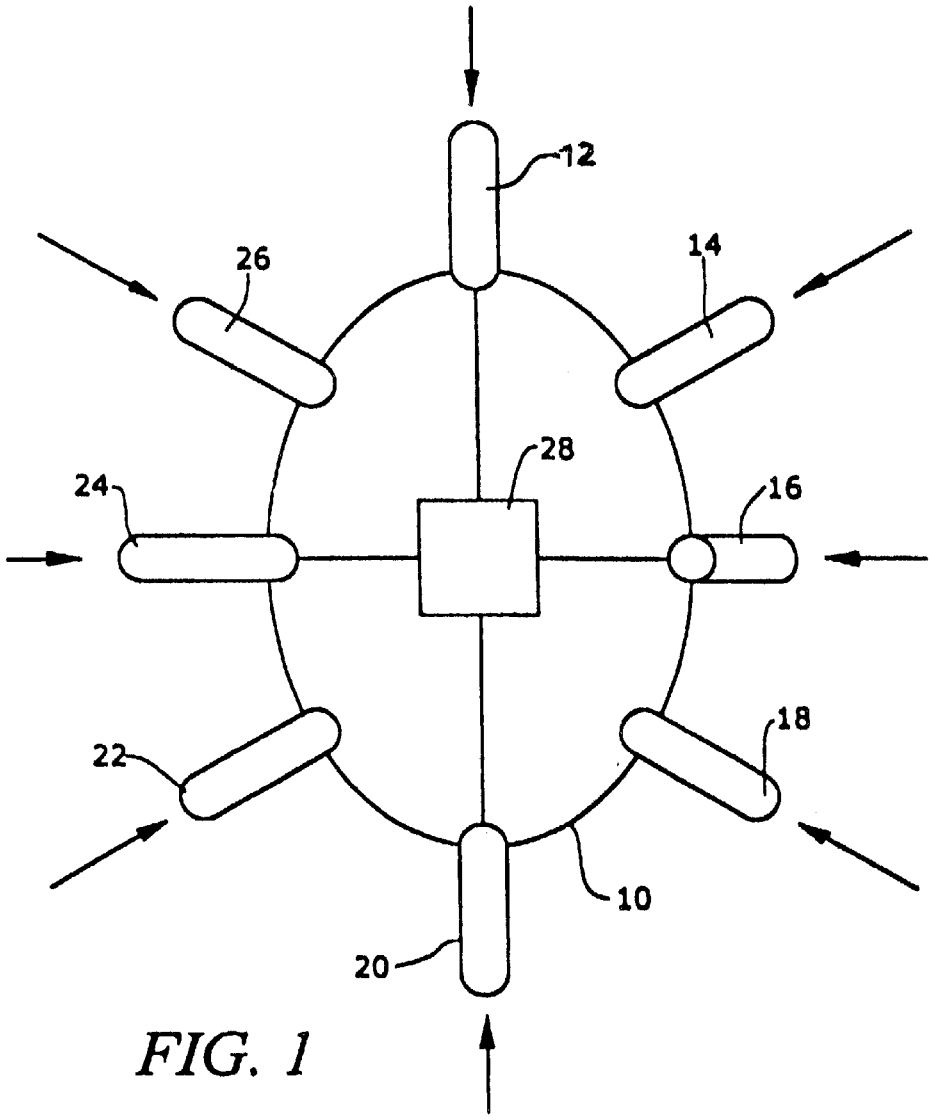
FIG. 1, in a schematic plan view, illustrates the global microphone system in accordance with the preferred embodiment of the present invention.

Referring to FIG. 1, there is illustrated in a schematic plan view, a global microphone system in accordance with the preferred embodiment of the present invention. The global microphone system includes a frame 10. As the plan view of FIG. 1 indicates, frame 10 has a generally oval outer perimeter and has the cross-section of a flattened sphere. Microphones 12, 14, 16, 18, 20, 22, 24, 26 are mounted on frame 10 such that their diaphragms are oriented outwards from frame 10. Microphones 12–26 each have a hypercardioid pick-up pattern. In the preferred embodiment of the invention the frame 10 is generally football-shaped and microphones 12–26 are mounted on the peripheray of the frame. As will be apparent one skilled in the art, any combination of frame shape and microphone placement which provides a generally elliptical placement of the microphones 12–26 will be suitable.

The global microphone system of the preferred embodiment illustrated in FIG. 1 has microphone 28 mounted centrally on the top of frame 10. Microphone 28 has a hemispherical pick-up pattern which is directed upward from frame 10.

Figure 2:
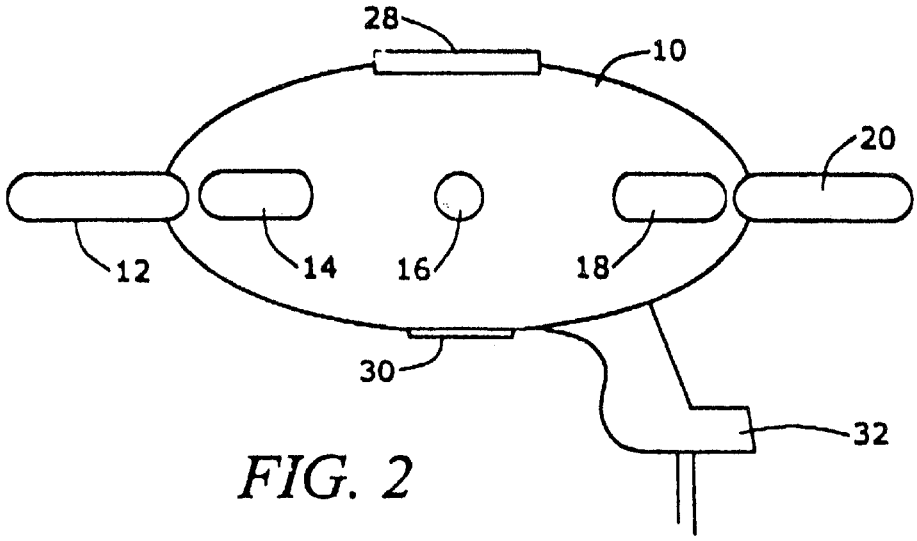
FIG. 2, in a schematic elevational view, illustrates the global microphone system of FIG. 1.

In FIG. 2, there is illustrated in a schematic elevational view, the global microphone system of the preferred embodiment. FIG. 2 illustrates the elevational orientation of microphones 12, 26, 24, 22, 20 as well as 28. A second hemispherical pick-up pattern microphone 30 is shown mounted on the central bottom portion of frame 10. The hemispherical pick-up pattern of microphone 30 is directed downward from frame 10. Frame 10 has a hand grip 32 which is attached to the bottom rear quadrant of frame 10.

Figure 3:
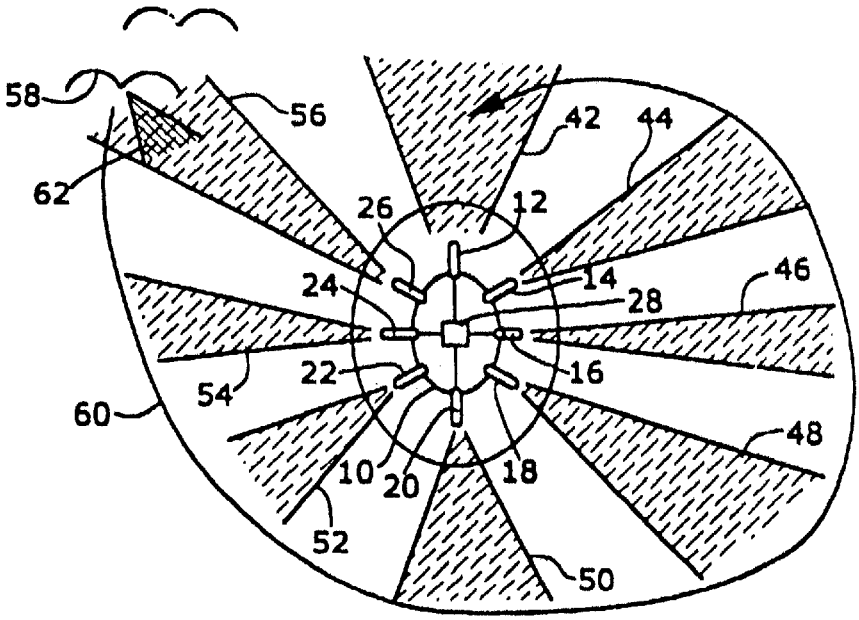
FIG. 3, in a schematic plan view, illustrates the operation of the global microphone system of FIG. 1.

In FIG. 3, the global microphone system of the preferred embodiment is illustrated in a schematic plan view. FIG. 3 shows the operation of the global microphone system. Frame 10 with microphones 12–26 is shown. Microphone 12 is shown with associated pick-up pattern 42, as are microphones 14, 16, 18, 20, 22, 24, 26 with associated pick-up patterns 44, 46, 48, 50, 52, 54, 56 respectively. FIG. 3 shown a bird 58 moving along at line 60.

Figure 4:
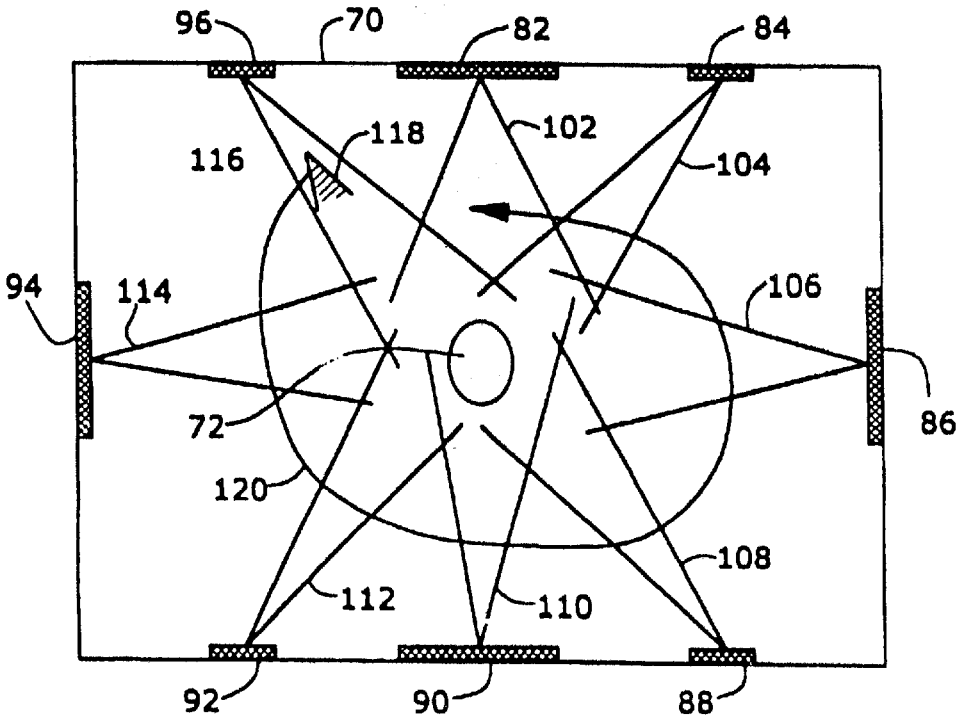
FIG. 4, in a schematic plan view, illustrates the replaying of a recording made with the global microphone system of FIG. 1.

In FIG. 4, the operation of replaying a recording made with the global microphone system of the preferred embodiment is illustrated in a schematic plan view. A listening chamber or theatre 70 contains a listener 72. Speakers 82, 84, 86, 88, 90, 92, 94, 96 are located about the periphery of the theatre 70. Each of speakers 82, 84, 86, 88, 90, 92, 94, 96 have respective auditory patterns 102, 104, 106, 108, 110, 112, 114, 116.

In operation, the global microphone system of FIG. 1 may be hand-held using hand grip 32 shown on FIG. 2 and placed in the vicinity of a sound be recorded.

FIGS. 3 and 4 shown how the global microphone system of the preferred embodiment may be used to record a moving object such as a bird.

In FIG. 3 bird 58 admits a sound 62. The sound 62 is within the linear pick-up pattern 56 of microphone 26 and therefore registers on microphone 26. Because sound 62 is not within the linear pick-up patterns of microphones 12–24, the sound 62 is not recorded to any appreciable degree by these other microphones. Assuming the bird is above the level of the frame 10, microphone 28 will record sound 62 as well as microphone 26, due to the hemispherical pick-up pattern of microphones 28. As the bird flys along line 60, other sounds made by the bird will be able to be picked by microphones 24, 22, 20, 18, 16, 14, 12, in sequence.

In one option, each of the microphones mounted on frame 10 is connected to single channel of a multi-channel digital mixer, which is in turn connected to a channel of a multi-channel digital recording device.

In playing back the sound recorded as described above with respect to FIG. 3, in the theatre 70 of FIG. 4, each of the channels of the sound recording corresponding to microphones 12–26 are individually played back through speakers 82–96, respectively. In the example of FIG. 4, there are no separate speakers corresponding to channels of recorded sound originating from microphones 28 or 30. These channels may either be ignored in the sound reproduction of FIG. 4 or may be mixed with other channels recorded from microphones 12–26.

With respect to FIG. 4, the flight of bird 28 shown in FIG. 3 is reproduced for listener 72. Sound 62 is shown reproduced by speaker 96 as sound 118 contained within the auditory pattern 116 of speaker 96. Speaker 96 replays the input to microphone 26 as recorded on the individual channel of the multi-channel recording device corresponding to microphone 26. As shown in FIG. 4, the listener will experience the sounds corresponding to the flight of the bird along path 60 shown in FIG. 3 as represented by line 120 in FIG. 4. Each of microphone pick-up patterns 42–56 are recreated by speaker auditory patterns 102–116. As is apparent, the surround sound recording made as shown and described above with respect to FIG. 3 will provide listener 72 with a natural recreation of the original sound source to provide a natural sound environment in real time accuracy.

As will also be apparent from the above description, the fact that the global sound microphone system is capable of being hand held using hand grip 32 shown in FIG. 2, or capable of being mounted on a camera, permits the effect of motion of the microphone system to be created for the listener in, for example, theatre 70 as shown in FIG. 4.

This creates the auditory and vestibular effect of the listener "moving" with the point of view of a camera as a camera moves through a scene. This serves to heighten the realistic effect for the listener 72.

In the preferred embodiment of the invention, the effect of the system is strongest where the pick-up patterns 42–56 of microphones 12–26 are each a very linear hypercardioid pick-up pattern. This provides good separation between each microphone and hence, each channel in a multi-channel recording device.

Multi-channel surround sound systems in use have different speaker placement configurations within the listening environment. A switchable pattern between the different microphone diaphragms 12–26 and 28, 30 is provided in order to accommodate the different audio systems. Any number of microphones can be turned on and off. For example, two microphones may be utilized to achieve a stereo effect, 4 for quadraphonic, more for THX and soforth.

Other variations and modifications of the invention are possible. For example, the frame of the microphone system may be a star-shaped arrangement of struts to maintain the microphones in the desired relationship. All such modifications or variations are believed to be within the sphere and scope of the invention as defined by the claims appended hereto.

Also, the scope of the invention includes any number of channels in the above configuration to allow an infinite pick-up with corresponding numbers of attachments to the channels of the multi-track recording device to receive a corresponding plurality of signals.

The embodiments of the invention in which an exclusive property or privilege is claimed are defined as follows:

1. A multi-channel sound reproduction system comprising:

a multi-channel microphone array including:

a plurality of linear pick-up pattern microphones, each having a diaphragm;

at least one hemispherical pick-up pattern microphone having a substantially hemispherical pick-up pattern; and a portable frame having: means for mounting said plurality of said linear microphones with diaphragms forming a generally elliptical non-circular microphone arrangement pattern, each diaphragm facing outwards from the frame directing an associated linear pick-up pattern at a predetermined polar orientation; and means for mounting the hemispherical microphone within said elliptical pattern;

multi-channel mixer with means for individually connecting each said linear microphone to a corresponding individual channel;

a multi-channel sound recording device each channel thereof communicating with a corresponding channel of the mixer; and a multi-channel playback system including:

a plurality of playback speakers, each speaker having means for communicating with an individual channel of the recording device and having an auditory playback pattern directed towards a stationary listener position, the polar orientation of each playback pattern corresponding with the polar orientation of the associated linear microphone communicating with the associated individual channel.

2. A system according to claim 1 wherein the orientation of the hemispherical pick-up pattern is substantially normal to the elliptical pattern.

3. A system according to claim 2 wherein the orientation of the hemispherical pick-up pattern is directed upwards.

4. A system according to claim 2 wherein the orientation of the hemispherical pick-up pattern is directed downwards.

5. A system according to claim 1 wherein each linear microphone has a directional pick-up pattern.

6. A system according to claim 1 wherein the means for mounting linear microphones comprises means for mounting one linear microphone at a position at one end of the elliptical pattern and for mounting the remaining linear microphones in a generally equispaced relationship.

7. A system according to claim 1 further comprising a hand grip depending downwards from the frame and means for connection to the grip of a device selected from the group consisting of: a camera; and a microphone stand.

8. A system according to claim 1 including means for attaching the frame to a device selected from the group consisting of: a camera; and a microphone stand.

9. A system according to claim 1 further comprising means for switching selected microphones on and off.

*10. A multi-channel sound reproduction system comprising a frame configured as an oblate spheroid having an elliptical outer perimeter, a plurality of circumferentially spaced microphones mounted on said perimeter, each of said microphones having a diaphragm oriented outwardly from the frame and a directional pick-up pattern, whereby "surround sound" is produced.*

*11. A system according to claim 10, where a first microphone is mounted centrally on the top of the frame, said first microphone having a hemispherical pick-up pattern directed unwardly from the frame.*

*12. A system according to claim 11, wherein a second microphone is mounted centrally on the bottom of the frame, said second microphone having a hemispherical pick-up pattern directed downwardly from the frame.*

*13. A microphone system according to claim 10, wherein said plurality of circumferentially spaced microphones lie within a plane, said diaphragms of said plurality of microphones lying on a non-circular generally elliptical figure when viewed in a direction perpendicular to said plane.*

*14. A microphone system as claimed in claim 10, wherein each microphone of said plurality of microphones has a hypercardioid or other linear pick-up pattern.*

*15. A microphone system as claimed in claim 10, wherein said plurality of microphones are mounted in a generally equispaced relationship about said frame.*

*16. A microphone system as claimed in claim 10, further comprising a multi-channel mixer and means for electrically connecting each one of said plurality of microphones with a respective channel of the multi-channel mixer.*

*17. A microphone system as claimed in claim 12, further comprising a multi-channel mixer and means for electrically connecting each of said first and second hemispherical pick-up pattern microphones to a respective channel of said multi-channel mixer.*

*18. A microphone system as claimed in claim 16, wherein said multi-channel mixer is an audio mixer.*

*19. A microphone system as claimed in claim 16, further comprising a multi-channel sound recording device and means for operatively connecting the multi-channel mixer with the multi-channel sound recording device.*

*20. A microphone system as claimed in claim 10, further comprising means for selectively electronically connecting and disconnecting individual ones of the plurality of microphones to adapt the system for a predetermined sound playback configuration.*

* * * * *